(12) United States Patent
Robins et al.

(10) Patent No.: US 7,167,267 B2
(45) Date of Patent: Jan. 23, 2007

(54) NOISE REDUCTION IN AN IMAGE CAPTURING DEVICE

(75) Inventors: Mark N. Robins, Greeley, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1044 days.

(21) Appl. No.: 10/025,082

(22) Filed: Dec. 19, 2001

(65) Prior Publication Data

US 2003/0112473 A1      Jun. 19, 2003

(51) Int. Cl.
 *H04N 1/48* (2006.01)
(52) U.S. Cl. ..................... 358/1.16; 358/513
(58) Field of Classification Search ............... 358/1.9, 358/2.1, 1.16–1.17, 513–516, 461
See application file for complete search history.

(56) References Cited

U.S. PATENT DOCUMENTS

| | | | | |
|---|---|---|---|---|
| 4,200,934 A | | 4/1980 | Hofmann | .................... 364/571 |
| 5,132,801 A | | 7/1992 | Yamano | ................ 358/213.16 |
| 5,216,511 A | * | 6/1993 | Tani | .......................... 348/243 |
| 5,712,890 A | * | 1/1998 | Spivey et al. | ................. 378/37 |
| 5,812,703 A | * | 9/1998 | Juen et al. | .................. 382/274 |
| 6,101,287 A | | 8/2000 | Corum et al. | ............... 382/274 |
| 6,144,408 A | * | 11/2000 | MacLean | .................... 348/241 |
| 6,546,076 B1 | * | 4/2003 | Hull et al. | ................. 378/98.3 |
| 6,714,241 B2 | * | 3/2004 | Baer | .......................... 348/241 |

* cited by examiner

*Primary Examiner*—Thomas D. Lee
*Assistant Examiner*—Stephen Brinich

(57) ABSTRACT

An image capturing device includes an electronic image sensor and a memory including a dark frame buffer that stores one or more dark frames generated by the electronic image sensor. A processor controls the electronic image sensor to substantially continuously capture and store a newest dark frame from the electronic image sensor when the electronic image sensor is not performing an image capture. The processor subtracts the newest dark frame from an image upon an image capture.

22 Claims, 3 Drawing Sheets

NOISE REDUCTION IN AN IMAGE CAPTURING DEVICE

FIELD OF THE INVENTION

The present invention relates generally to an image capturing device, and more particularly to real time noise characterization and reduction in an electronic image sensor of an image capturing device.

BACKGROUND OF THE INVENTION

Image capturing devices are commonly used to capture scenes, persons, events, settings, etc. Image capturing devices may come in a variety of types including, for example, digital still cameras and video cameras. A typical image capturing device includes a lens and an electronic image sensor, such as a charge-coupled device (CCD) or complementary metal oxide semiconductor (CMOS) array. The electronic image sensor comprises a two-dimensional array of light sensitive pixel elements that produce electronic signals in response to light. The electronic image sensor therefore outputs electronic signals that are related to the amount of light impinging on the individual pixel elements of the array.

One problem encountered with an electronic image sensor is noise that is picked up during an image capturing process. In addition to creating an output signal based on light impinging on the sensor elements, the sensor array may also create output signals based on noise, where the noise is generated by unwanted light or generated due to thermal effects or stray currents in the electronic image sensor. This noise corrupts a captured image and therefore is highly undesirable.

A first prior art noise reduction approach involves dark frame subtraction, wherein the prior art camera captures a regular image and then captures a dark image. The dark image is captured at about the same exposure time and generally is captured when the shutter is closed, i.e., when the electronic image sensor is dark. The prior art approach thereafter subtracts the dark image information from the regular image information in order to remove the noise from the regular image. This improves the overall image captured by the image capturing device.

However, this prior art approach has several drawbacks. Capturing a dark image after a regular image requires an exposure for each image capture (i.e., a double exposure). This increases shot-to-shot time, and moreover increases processing time. This processing time requires a time component for capturing the dark image and a time component for subtracting the dark image.

A second prior art noise reduction approach employs a fixed dark cell in the camera. This dark cell may be a pixel element that does not participate in an image capture, but instead is a pixel element that is sealed off or covered and cannot generate anything but a dark reading (i.e., a blind cell). The dark cell gives an average or approximate noise reading for the entire electronic image sensor and does not give a reading for each individual pixel element. This average noise value is then subtracted from all pixels of the captured image. This prior art approach is much faster than a full dark image capture, and does not require a dark image capture after the regular image capture, i.e., the dark cell may obtain a reading concurrently with the image capture.

However, there are drawbacks in the second prior art approach. The dark cell is less effective at noise reduction. The dark cell output may not accurately reflect the varying noise levels in each individual pixel element. The dark cell approach therefore does not take into account variations in pixel elements and moreover becomes less accurate over long exposure periods where pixel-to-pixel noise variations can be significant.

Therefore, there remains a need in the art for improvements in noise reduction for electronic image sensors.

SUMMARY OF THE INVENTION

An image capturing device comprises an electronic image sensor and a memory including a dark frame buffer that stores one or more dark frames generated by the electronic image sensor. A processor controls the electronic image sensor to substantially continuously capture and store a newest dark frame from the electronic image sensor when the electronic image sensor is not performing an image capture. The processor subtracts the newest dark frame from an image upon an image capture.

DETAILED DESCRIPTION

Figure 1:
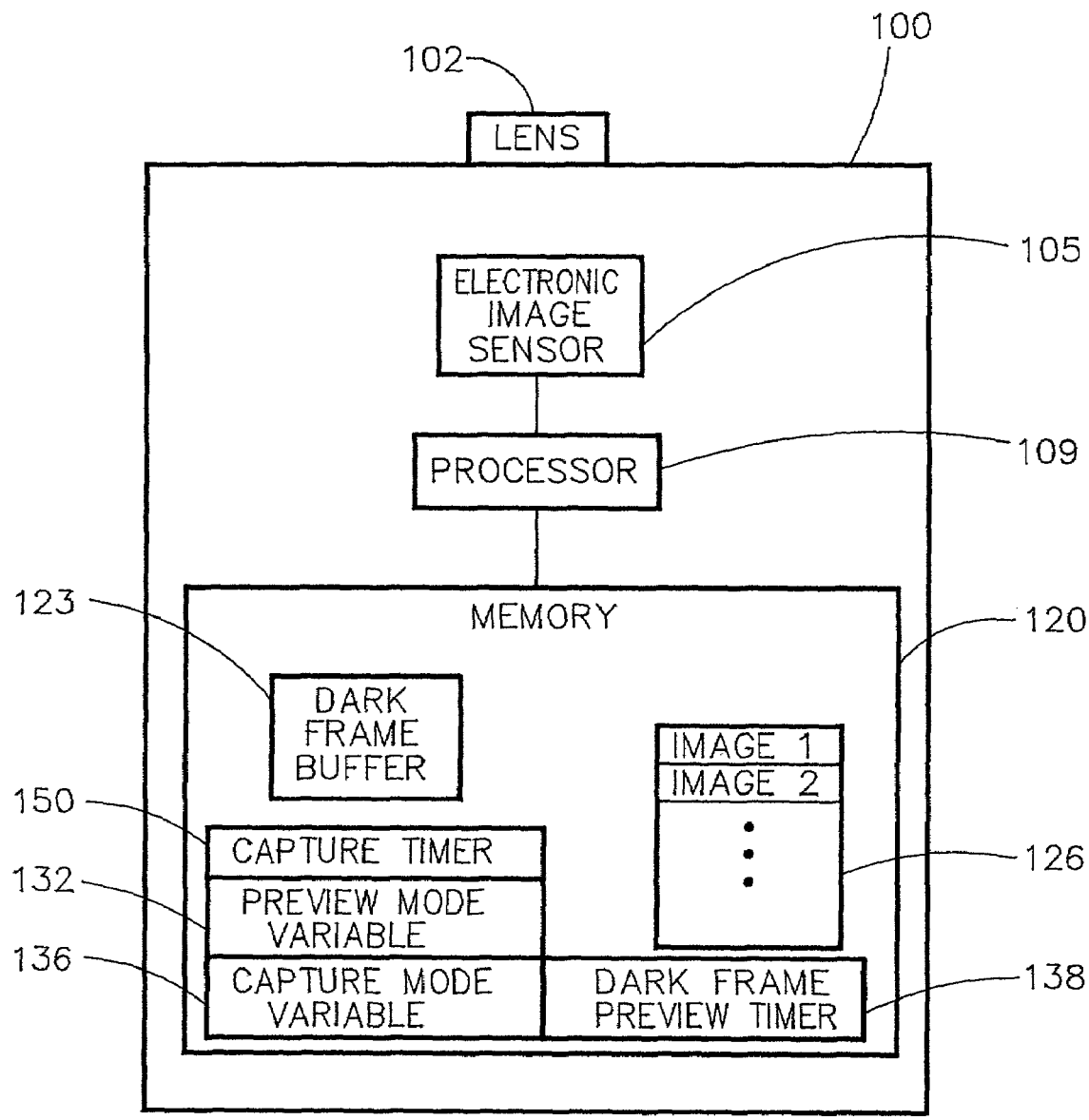
FIG. 1 is a schematic diagram of an image capturing device according to one embodiment of the invention.

FIG. 1 is a schematic diagram of an image capturing device 100 according to one embodiment of the invention. The image capturing device 100 includes a lens apparatus 102, an electronic image sensor 105, a processor 109, and a memory 120.

The electronic image sensor 105 may be any type of electronic image sensor that comprises an array of individual pixel elements. For example, the electronic image sensor 105 may be a charge-coupled device (CCD) or complementary metal oxide semiconductor (CMOS) array.

The memory 120 may be any type of digital memory. The memory 120 may include, among other things, a dark frame buffer 123, a plurality of images 126, a preview mode variable 132, a capture mode variable 136, a dark frame preview timer 138, and a capture timer 150. In addition, the memory 120 may store software or firmware to be executed by the processor 109.

The processor 109 may be any type of general purpose processor. The processor 109 executes a control routine contained in the memory 120. In addition, the processor 109 receives inputs and conducts image capturing, image manipulating and processing, and image storing processes.

The dark frame buffer 123 is a circular buffer capable of holding one or more captured dark frames. A dark frame is a set of values for all pixel elements in the electronic image sensor 105. The one or more dark frames may be stored for a period of time. The period of time depends on the size of the circular buffer. Therefore, the dark frame buffer 123 essentially comprises a continuous loop wherein as a newest dark frame is stored, it replaces an oldest dark frame in the dark frame buffer 123. Consequently, at any point in time, the dark frame buffer 123 contains a substantially current dark frame.

The capture mode variable 136 is a variable that indicates when the image capturing device 100 is engaged in an image capture operation, such as a shutter operation, for example. The capture mode variable may be set in response to a shutter button press.

A dark frame may be captured only when the shutter of the image capturing device 100 is closed. Therefore, when the image capturing device 100 is not capturing images, it may capture dark frames and store them to the dark frame buffer 123.

The dark frame data contained within the dark frame buffer 123 may be used whenever an image capture occurs. Therefore, upon an image capture, the processor 109 may recall the most current dark frame from the dark frame buffer 123 and subtract it from the captured image, with the captured image then being stored, such as in the image storage 126.

In operation, the processor 109 may substantially continuously initiate the capture of dark frames and store them in the dark frame buffer 123. Therefore, for example, a new dark frame capture may be performed substantially immediately upon completion of a previous dark frame capture. Alternatively, a sliding average may be calculated and maintained, wherein a newly captured dark frame is calculated into an existing dark frame average. The sliding average therefore may be an average of a predetermined number of recently acquired dark frames or may be an average of all dark frames acquired within a predetermined time period.

As a result, upon an image capture, a substantially current dark frame is available. This substantially current dark frame characterizes image noise and may be subtracted from the image in order to reduce the noise in the image. The image is thereby greatly improved, and without the dark frame capture unduly interfering with the image capturing process.

Alternatively, the image capturing device 100 may periodically capture dark frames, such as upon a predetermined time period. For example, the predetermined time period may be loaded into the capture timer 150. When the capture timer 150 expires, a dark frame may be captured, and the capture timer 150 is reloaded with the predetermined time period. In this manner, the dark frames may be captured in a substantially continuous manner, but yet without consuming excessive processor time and without consuming excessive electrical power.

The preview mode variable 132 is a variable that indicates whether the image capturing device 100 is in a preview mode. A preview mode is a mode wherein the electronic image sensor 105 is exposed by the lens apparatus 102 and generates a live display to the user. The preview mode variable 132 is set by a user, and may change in response to a press of an input button, sliding of a lens cover door, etc. The preview mode allows the user to set up a shot in real time. When the user is satisfied that the image is ready for capture, the user may initiate the image capture. Therefore, the preview mode is essentially continuously capturing an image in the electronic image sensor 105.

The dark frame preview timer 138 may be used by the processor 109 to capture dark frames even when the image capturing device 100 is in a preview mode. The dark frame preview timer 138 may be loaded with a predetermined time period, and a dark frame may be captured when the dark frame preview timer 138 expires. The dark frame preview timer 138 may then be reloaded and the process repeated for as long as the image capturing device 100 is in the preview mode.

Figure 2:
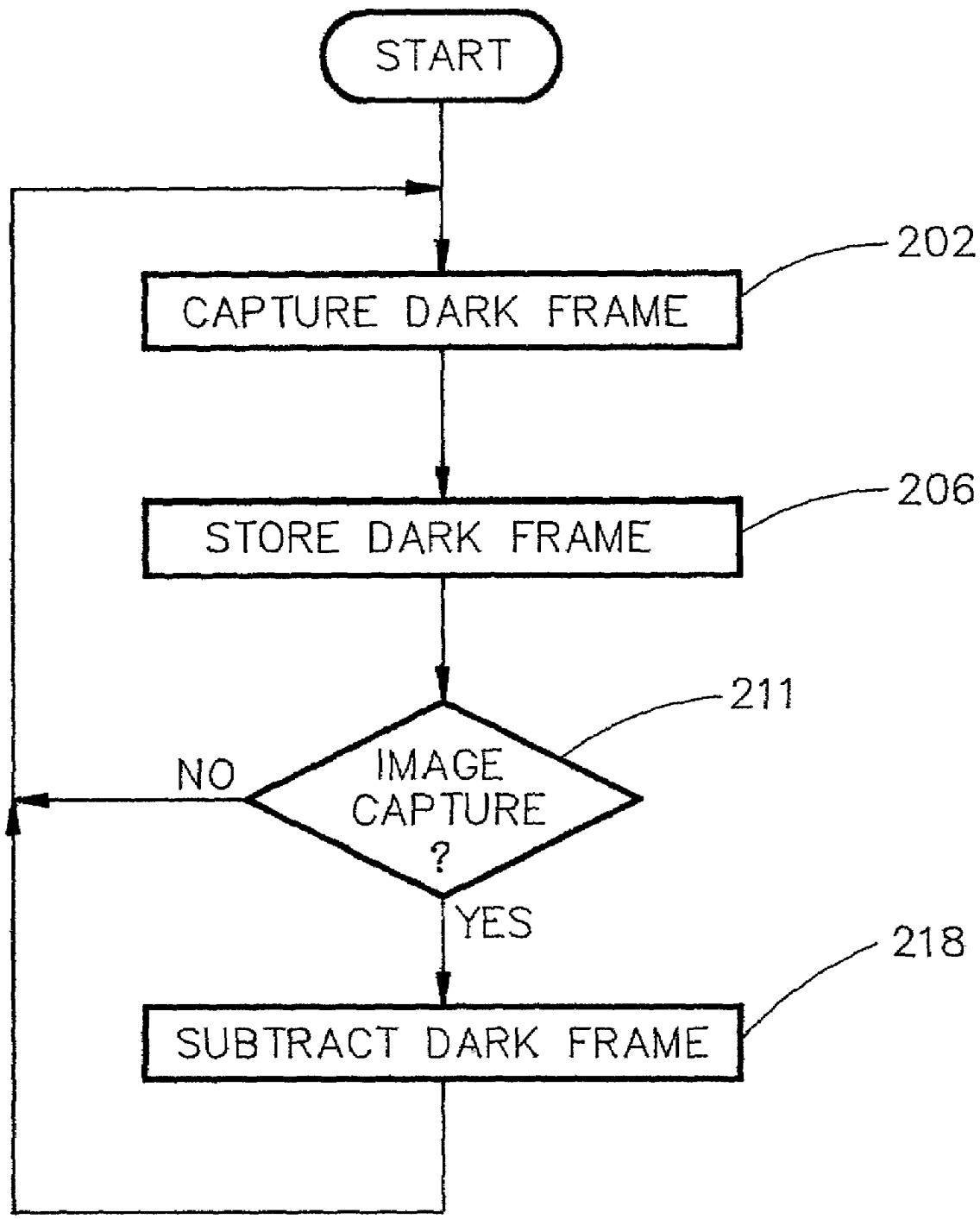
FIG. 2 is a flowchart of a noise reduction method according to one embodiment of the invention.

FIG. 2 is a flowchart 200 of a noise reduction method according to one embodiment of the invention. In step 202, a dark frame is captured. This dark frame may be captured at any time and is done on a pixel-by-pixel basis. The dark frame capturing is substantially continuously performed, including performing a periodic dark frame capturing.

In step 206, the dark frame is stored in the dark frame buffer 123. The dark frame buffer 123 may store one or more dark frames, with the newest dark frame replacing a dark frame in the dark frame buffer 123. If the dark frame buffer 123 can store more than one dark frame, the oldest dark frame in the dark frame buffer 123 may be replaced by the newest dark frame.

In step 211, the image capturing device 100 determines whether it is performing an image capture. If it is not performing an image capture, the method branches back to step 202 where another dark frame is captured and stored. This branching implements the substantially continuous dark frame capturing. If an image capture is occurring, the method proceeds to step 218 (the image capture status may be determined by inspecting the capture mode variable 136 in the memory 120).

In step 218, the newest (i.e., the most recently captured) dark frame is subtracted from the captured image. The captured image may then be further processed or stored as desired.

It should be understood that the flowchart 200 shows a noise compensation method performed when the image capturing device 100 is not in a preview mode. The preview mode is addressed below, in the discussion accompanying FIG. 3.

Figure 3:
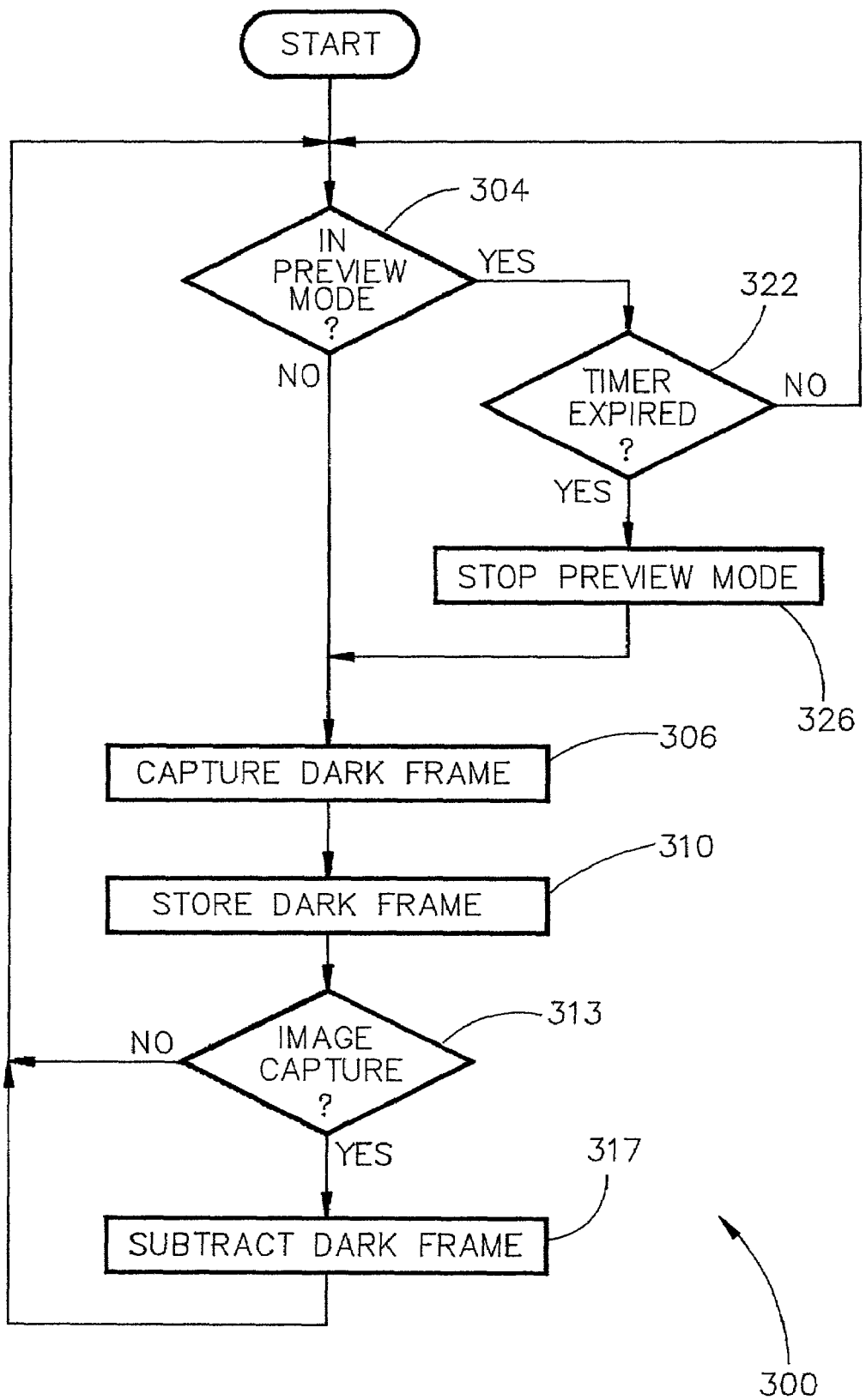
FIG. 3 is a flowchart of a noise reduction method according to another embodiment of the invention.

FIG. 3 is a flowchart 300 of a noise reduction method according to another embodiment of the invention. In step 304, the method determines whether the image capturing device 100 is in a preview mode. If it is not, the method proceeds to step 306; otherwise, it proceeds to step 322.

In step 306, as before, a dark frame is substantially continuously captured.

In step 310, as before, the dark frame is stored.

In step 313, as before, the method checks whether an image capture is occurring; if not, the method proceeds back to step 304; otherwise, it proceeds to step 317.

In step 317, as before, the dark frame is subtracted from the captured image in order to perform the noise reduction.

In step 322, in the preview mode, the image capturing device 100 checks the dark frame preview timer 138. If the dark frame preview timer 138 has not expired, the method loops and waits; otherwise, it proceeds to step 326.

In step 326, the preview mode is stopped due to the expiration of the dark frame preview timer 138. The preview mode is stopped by momentarily closing the shutter (i.e., interrupting the preview mode). Thereafter, in steps 306 and 310, a dark frame is captured and stored, as previously discussed. The dark frame data therefore is captured at predetermined time intervals during the preview mode. The dark frame capture cannot occur until the preview mode is stopped and the shutter (not shown) is closed. The preview mode may then be resumed by re-opening the shutter. This will not objectionably affect the preview mode, as the dark frame capture typically takes only about 25 to about 50 milliseconds to accomplish.

It should be understood that alternatively if the image capturing device 100 is in the preview mode, the dark frame capture may simply be ignored until the preview mode is over (potentially eliminating steps 322 and 326).

Noise reduction of the invention applies to digital still cameras and video cameras, including still cameras having a preview feature wherein the user may preview an image before capturing it. Moreover, the invention may apply to any image capturing device that employs an electronic image sensor wherein it is desired to reduce the noise in the signal captured by the electronic image sensor.

The invention differs from the prior art in that it provides a highly effective noise compensation, but yet without interfering with the image capturing process. The invention accomplishes this by capturing dark frames during idle times in the image capturing device 100 and uses the most current dark frame data that is captured during idle times. This may include periodically capturing dark frames during a preview mode. Therefore, the invention accomplishes a highly accurate noise characterization and reduction, but yet while causing less interference with picture taking time by not consuming excess image capturing and processing time between shots. Therefore, the invention advantageously moves the noise compensation processing time away from the time between shots and accomplishes the dark frame sampling and noise compensation at times when the camera is relatively idle.

The invention therefore provides a pixel-by-pixel noise characterization and reduction in order to optimally reduce noise in an image. The invention advantageously accomplishes this without requiring any delay in image capture and without a need to schedule a dark frame capture around an image capture occurrence or occurrences.

We claim:

1. An image capturing device, comprising:
an electronic image sensor;
a memory including a dark frame buffer that stores one or more dark frames generated by said electronic image sensor, the memory further including a capture mode variable that indicates when said image capturing device is capturing an image and/or a preview mode variable that indicates when said image capturing device is operating in a preview mode; and
a processor communicating with said electronic image sensor and said memory, with said processor controlling said electronic image sensor to substantially continuously capture and store a newest dark frame from said electronic image sensor when said electronic image sensor is not performing an image capture and subtracting said newest dark frame from an image upon an image capture.

2. The image capturing device of claim 1, wherein said dark frame buffer comprises a circular buffer.

3. The image capturing device of claim 1, wherein said dark frame buffer stores a plurality of dark frames.

4. The image capturing device of claim 1, wherein said image capturing device comprises a digital still camera.

5. The image capturing device of claim 1, with said memory further being capable of storing one or more images captured by said electronic image sensor.

6. The image capturing device of claim 1, wherein said memory further includes a preview mode variable that indicates when said image capturing device is operating in a preview mode and wherein said processor interrupts said preview mode in order to capture a dark frame.

7. The image capturing device of claim 1, wherein said memory further includes a preview mode variable that indicates when said image capturing device is operating in a preview mode and further includes a dark frame preview timer, wherein said processor interrupts said preview mode upon expiration of said dark frame preview timer in order to capture a dark frame.

8. A noise reduction method for an electronic image sensor of an image capturing device, comprising the steps of:

(a) capturing a first dark frame in said electronic image sensor when said electronic image sensor is not performing an image capture;
(b) storing said first dark frame;
(c) after capturing the first dark frame, determining whether said electronic image sensor is performing an image capture;
(d) in response to determining that said electronic image sensor is not performing an image capture, capturing a second dark frame in said electronic image sensor and storing said second dark frame; and
(e) if in said step (c) it is determined that said electronic image sensor is performing an image capture, then subtracting said first dark frame from the captured image,
wherein said subtracting reduces noise in said image.

9. The method of claim 8, wherein said storing of said second dark frame replaces the first stored dark frame.

10. The method of claim 8, wherein said first dark frame is calculated into a sliding average of captured dark frames.

11. The method of claim 8, wherein the capturing, storing, and subtracting steps occur when a image capturing device is not in said preview mode.

12. The method of claim 8, further comprising:
prior to capturing the first dark frame, checking whether said image capturing device is in a preview mode, wherein the steps of capturing and storing the first dark frame occur when said image capturing device is not in said preview mode;
stopping said preview mode if said image capturing device is in said preview mode in preparation for capturing storing said first dark frame; and
resuming said preview mode after capturing and storing said first dark frame.

13. The method of claim 8, further comprising:
prior to performing step (a), performing the steps of: (1) checking whether said image capturing device is in a preview mode; (2) checking a dark frame preview timer; and then (3) stopping said preview mode if said image capturing device is in said preview mode and said dark frame preview timer is expired and then performing step (a).

14. A noise reduction method for an electronic image sensor of an image capturing device, comprising the steps of:
checking whether said image capturing device is in a preview mode;
checking a dark frame preview timer if said image capturing device is in said preview mode;
stopping said preview mode if said image capturing device is in said preview mode and if said dark frame preview timer is expired;
capturing a newest dark frame in said electronic image sensor if said electronic image sensor is not performing an image capture and if said preview mode is not active;
storing said newest dark frame and
subtracting said newest dark frame from an image upon an image capture;
wherein said subtracting reduces noise in said image.

15. The method of claim 14, wherein said storing of said newest dark frame replaces an oldest stored dark frame.

16. The method of claim 14, further comprising the preliminary step of checking whether said image capturing device is in a preview mode, wherein the capturing, storing, and subtracting steps occur when said image capturing device is not in said preview mode.

17. The method of claim 14, further comprising the preliminary steps of:

checking whether said image capturing device is in a preview mode, wherein the capturing, storing, and subtracting steps occur when said image capturing device is not in said preview mode; and stopping said preview mode if said image capturing device is in said preview mode.

18. The method of claim 14, wherein the step of stopping said preview mode comprises closing an image capturing device shutter.

19. A noise reduction method for an electronic image sensor of an image capturing device, comprising the steps of:

substantially continuously capturing a newest dark frame in said electronic image sensor when said electronic image sensor is not performing an image capture;

storing said newest dark frame; and subtracting said newest dark frame from an image upon an image capture, wherein said subtracting reduces noise in said image, and said newest dark frame is calculated into a sliding average of captured dark frames.

20. A noise reduction method for an electronic image sensor of an image capturing device, comprising the steps of:

determining whether said image capturing device is in a preview mode;

if said image capturing device is in a preview mode, then interrupting the preview mode to perform the steps of: (a) capturing a dark frame in said electronic image sensor; and (b) storing said dark frame;

after capturing and storing the dark frame, capturing an image;

subtracting said dark frame from the captured image, wherein the subtracting reduces noise in said image.

21. The method of claim 20, further comprising resuming said preview mode after capturing and storing the dark frame but before capturing the image.

22. The method of claim 20, further comprising:

checking a dark frame preview timer; and interrupting said preview mode only if said image capturing device is in said preview mode and said dark frame preview timer has expired.

\* \* \* \* \*

UNITED STATES PATENT AND TRADEMARK OFFICE
CERTIFICATE OF CORRECTION

PATENT NO.        : 7,167,267 B2                                    Page 1 of 1
APPLICATION NO. : 10/025082
DATED             : January 23, 2007
INVENTOR(S)       : Mark N. Robins et al.

It is certified that error appears in the above-identified patent and that said Letters Patent is hereby corrected as shown below:

In column 6, line 57, in Claim 14, after "frame" insert -- ; --.

Signed and Sealed this

Twelfth Day of May, 2009

JOHN DOLL
*Acting Director of the United States Patent and Trademark Office*